United States Patent
Kim

(10) Patent No.: US 10,983,204 B2
(45) Date of Patent: Apr. 20, 2021

(54) METHOD AND APPARATUS FOR DETERMINING OBJECT DIRECTION

(71) Applicant: Samsung Electronics Co., Ltd., Suwon-si (KR)

(72) Inventor: Dong Han Kim, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 16/114,406

(22) Filed: Aug. 28, 2018

(65) Prior Publication Data

US 2019/0361105 A1    Nov. 28, 2019

(30) Foreign Application Priority Data

May 25, 2018  (KR) .................. 10-2018-0059700

(51) Int. Cl.

| | | |
|---|---|---|
| *G01S 13/34* | (2006.01) | |
| *G01S 13/50* | (2006.01) | |
| *G01S 13/931* | (2020.01) | |
| *G01S 7/35* | (2006.01) | |
| *G01S 13/02* | (2006.01) | |
| *G01S 13/42* | (2006.01) | |
| *G01S 13/58* | (2006.01) | |
| *G01S 13/00* | (2006.01) | |

(52) U.S. Cl.
CPC ............ *G01S 13/34* (2013.01); *G01S 13/505* (2013.01); *G01S 13/931* (2013.01); *G01S 2007/356* (2013.01); *G01S 2013/93271* (2020.01)

(58) Field of Classification Search
None
See application file for complete search history.

(56) References Cited

U.S. PATENT DOCUMENTS

| | | | | | |
|---|---|---|---|---|---|
| 4,057,803 | A | * | 11/1977 | Coleman ................. | G01S 3/48 342/446 |
| 5,117,236 | A | * | 5/1992 | Chang ................. | H04B 7/088 342/367 |
| 5,138,327 | A | * | 8/1992 | Chang ................. | H04B 7/088 342/367 |
| 5,541,608 | A | * | 7/1996 | Murphy ................. | G01S 3/46 342/174 |

(Continued)

FOREIGN PATENT DOCUMENTS

| | | | | |
|---|---|---|---|---|
| EP | 1746735 A1 | * | 1/2007 | ............ H01Q 1/246 |
| KR | 10-1783777 B1 | | 10/2017 | |

OTHER PUBLICATIONS

Hee, Lee Kyong et al., "A Design of Switch Module for Selecting Antenna According to Detection of Received Signals", *Electronics and Telecommunications Research Institute, Hanbat National Univ*, 2015 (pp. 343-344).

(Continued)

*Primary Examiner* — Bernarr E Gregory
(74) *Attorney, Agent, or Firm* — NSIP Law

(57) ABSTRACT

A method and apparatus for determining a direction of an object using a plurality of antennas is disclosed. The method includes determining an optimal antenna pattern to determine the direction of the object from among a plurality of candidate antenna patterns using a portion of the antennas, and determining the direction of the object using the optimal antenna pattern.

17 Claims, 14 Drawing Sheets

(56) References Cited

U.S. PATENT DOCUMENTS

| | | | | |
|---|---|---|---|---|
| 5,559,806 A * | 9/1996 | Kurby | | H04B 7/18517 370/325 |
| 5,740,526 A * | 4/1998 | Bonta | | H04B 7/0817 455/277.2 |
| 5,818,385 A * | 10/1998 | Bartholomew | | H01Q 1/246 342/372 |
| 6,271,791 B1 * | 8/2001 | Bruzzone | | G01S 3/48 342/442 |
| 6,456,257 B1 * | 9/2002 | Zamat | | H01Q 25/002 343/853 |
| 6,633,265 B2 * | 10/2003 | Hirabe | | H01Q 3/2605 342/372 |
| 7,248,897 B2 * | 7/2007 | Hsu | | H04B 7/086 342/377 |
| 7,289,827 B2 * | 10/2007 | Proctor, Jr. | | H01Q 1/246 342/367 |
| 7,376,094 B2 * | 5/2008 | Chun | | H04B 7/086 370/295 |
| 8,005,418 B2 * | 8/2011 | Walker | | H04B 7/18519 455/3.02 |
| 9,655,133 B2 | 5/2017 | Negus et al. | | |
| 9,898,550 B2 * | 2/2018 | Ho | | H04B 7/0417 |
| 10,045,364 B2 * | 8/2018 | Shtrom | | H04B 17/102 |
| 2007/0057843 A1 * | 3/2007 | Chang | | H01Q 3/2605 342/368 |
| 2008/0309555 A1 * | 12/2008 | Fan | | H04B 17/309 342/372 |
| 2009/0296663 A1 * | 12/2009 | Wild | | H04B 7/0617 370/335 |
| 2014/0218226 A1 | 8/2014 | Raz et al. | | |

OTHER PUBLICATIONS

Lim, So-Hee et al., "Comparing Performance of Bartlett and CS Algorithm for DoA Estimation in Automotive Radar", *Department of Electrical and Computer Engineering and INMC, Seoul National University*, 2017 (pp. 111-112).

* cited by examiner

METHOD AND APPARATUS FOR DETERMINING OBJECT DIRECTION

CROSS-REFERENCE TO RELATED APPLICATIONS

This application claims the benefit under 35 USC § 119(a) of Korean Patent Application No. 10-2018-0059700 filed on May 25, 2018, in the Korean Intellectual Property Office, the entire disclosures of which is incorporated herein by reference for all purposes.

BACKGROUND

1. Field

The following description relates to a method and apparatus for determining a direction of an object using a plurality of antennas.

2. Description of Related Art

A driver assistance device provided in a vehicle may detect an object present around the vehicle by sending a signal into the vicinity of the vehicle, receiving a reflected signal, and analyzing the received signal. The driver assistance device may calculate a distance between the vehicle and the object based on the time it took for the signal to be reflected and returned, and determine a direction of the object based on an angle at which the reflected signal is received and strength of the reflected signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of determining a direction of an object using antennas, the method including determining an optimal antenna pattern to determine the direction of the object from among candidate antenna patterns using a portion of the antennas, and determining the direction of the object using the optimal antenna pattern.

The determining of the optimal antenna pattern may include determining a candidate antenna pattern having a maximum metric value from among metric values calculated for each of the candidate antenna patterns, and setting the determined candidate antenna pattern to be the optimal antenna pattern, wherein a metric value may include a value of power for a target direction relative to noise power.

The determining of the optimal antenna pattern further may include setting a first candidate antenna pattern from among the candidate antenna patterns, receiving M signals using the first candidate antenna pattern, generating N signals by reconstructing the M signals, generating a beam pattern for the N signals through beamforming, calculating a first metric value of the first candidate antenna pattern based on the beam pattern, and determining whether a metric value of each of the candidate antenna patterns is calculated.

The first antenna pattern may include M antennas selected from an array of N antennas.

The generating of the N signals by reconstructing the M signals may include generating the N signals based on the M signals through compressed sensing.

The method of claim 1, wherein the determining of the direction of the object may include receiving a reflected signal using the optimal antenna pattern, generating a weighting vector based on the reflected signal, determining an object detection region based on the weighting vector, reconstructing the reflected signal through compressed sensing, and determining the direction of the object based on the reconstructed reflected signal and the object detection region.

The determining of the direction of the object may include transmitting a signal, wherein the reflected signal is a signal of the transmitted signal reflected by the object.

The transmitted signal may be a signal modulated using a frequency modulated continuous wave (FMCW), a phase modulated continuous wave (PMCW), or a frequency-shift keying (FSK) scheme.

The determining of the object detection region may include generating a beam pattern based on the weighting vector, and determining the object detection region based on the beam pattern.

The determining of the direction of the object further may include determining a distance to the object and a speed of the object based on the reflected signal.

The determining of the object detection region based on the weighting vector may include determining, to be the object detection region, a region corresponding to the determined distance and the determined speed.

The method may include determining whether to change the optimal antenna pattern.

The determining of whether to change the optimal antenna pattern may include calculating a metric value of the optimal antenna pattern, and determining to change the optimal antenna pattern, in response to the metric value being less than a threshold value.

In another general aspect, there is provided an apparatus for determining a direction of an object, including a processor configured to determine an optimal antenna pattern to determine the direction of the object from among candidate antenna patterns using a portion of antennas, and determine the direction of the object using the optimal antenna pattern.

The processor may be configured to determine a candidate antenna pattern having a maximum metric value from among metric values calculated for each of the candidate antenna patterns, and set the determined candidate antenna pattern to be the optimal antenna pattern, wherein a metric value comprises a value of power for a target direction relative to noise power.

The processor may be configured to receive a reflected signal using the optimal antenna pattern, generate a weighting vector based on the reflected signal, determine an object detection region based on the weighting vector, reconstruct the reflected signal through compressed sensing, and determine the direction of the object based on the reconstructed reflected signal and the object detection region.

The processor may be configured to determine the optimal antenna pattern at periodic intervals.

The apparatus may include a memory storing instructions that, when executed, configure the processor to determine the optimal antenna pattern, and to determine the direction of the object.

In another general aspect, there is provided an apparatus for determining a direction of an object, including a radar including antennas, and a processor configured to determine a candidate antenna pattern having a maximum metric value from metric values calculated for respective candidate antenna patterns including a portion of the antennas, set the determined candidate antenna pattern to be the optimal antenna pattern, determine the direction of the object using the optimal antenna pattern, and render the object and the direction of the object on a display.

Other features and aspects will be apparent from the following detailed description, the drawings, and the claims.

Figure 1:
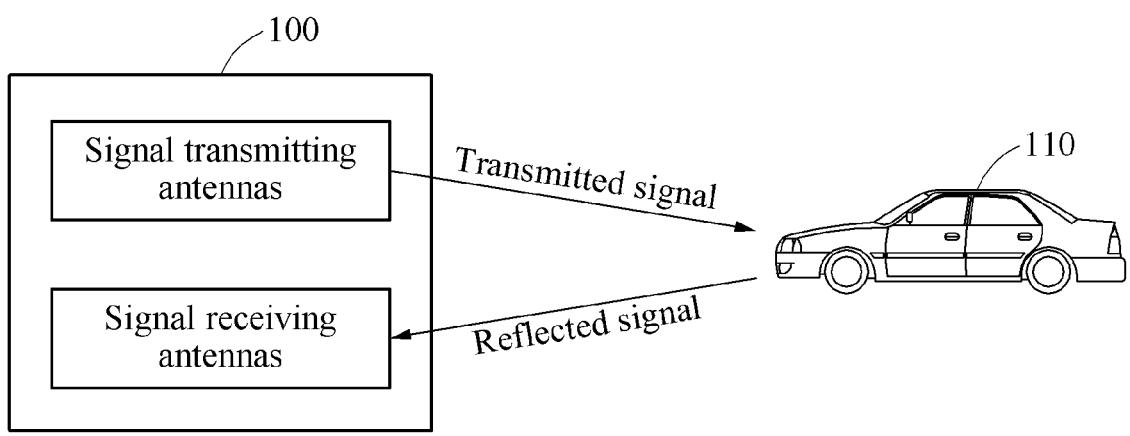
FIG. 1 is a diagram illustrating an example of a method of detecting an object using an antenna.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Also, in the description of example embodiments, detailed description of structures or functions that are thereby known after an understanding of the disclosure of the present application will be omitted when it is deemed that such description are superfluous.

FIG. 1 is a diagram illustrating an example of a method of detecting an object using an antenna.

Referring to FIG. 1, a method of sending or propagating a signal into the vicinity of the vehicle and detecting a signal reflected by the object 110 is used to detect an object 110 present around a vehicle. For example, when a radar 100 of the vehicle sends or propagates a signal into the vicinity of the vehicle to detect an object around the vehicle, a time of flight (ToF) may be calculated from a signal reflected by the object 110, a distance between the vehicle and the object 110 may thus be calculated, and a speed of the object 110 may also be calculated based on a Doppler effect, for example.

In this example, to distinguish the signal reflected by the object 110 from other signals such as noise, the radar 100 of the vehicle may send or propagate a modulated signal into the vicinity of the vehicle. The modulated signal may be a frequency modulated continuous wave (FMCW) signal. For example, the FMCW signal may be a signal with a frequency modulated based on 79 gigahertz (GHz). A bandwidth (BW) of the FMCW signal may be 77 GHz to 81 GHz, but is not limited thereto. For another example, the modulated signal may be a signal modulated using a frequency shift keying (FSK) scheme. For still another example, the modulated signal may be a phase modulated continuous wave (PMCW) signal with a modulated phase.

When using a millimeter wave in a 79 GHz band, a relatively high resolution may be provided.

As illustrated, the radar 100 includes signal transmitting antennas configured to transmit a signal. The signal transmitting antennas may be arranged at different directional angles, or arranged or embodied such that the directional angles are adjustable. The radar 100 also includes signal receiving antennas configured to receive a signal. The signal receiving antennas may be arranged at different directional angles, or arranged or embodied such that the directional angles are adjustable.

For example, when the object 110 is detected through the reflected signal, the vehicle may inform a driver regarding information of the object 110. For another example, the vehicle may assist the driver with an advanced driver assistance system (ADAS). For another example, when the vehicle is an autonomous vehicle or an automated self-driving vehicle, the vehicle may set a traveling path of the vehicle based on the object 110, or adjust the traveling path of the vehicle based on the object 110. The information of the object 110 may include, for example, information about a position, a speed, and a direction of the object 110.

Hereinafter, a method of determining a position, a speed, and a direction of an object will be described in detail with reference to FIGS. 2 through 14.

Figure 2:
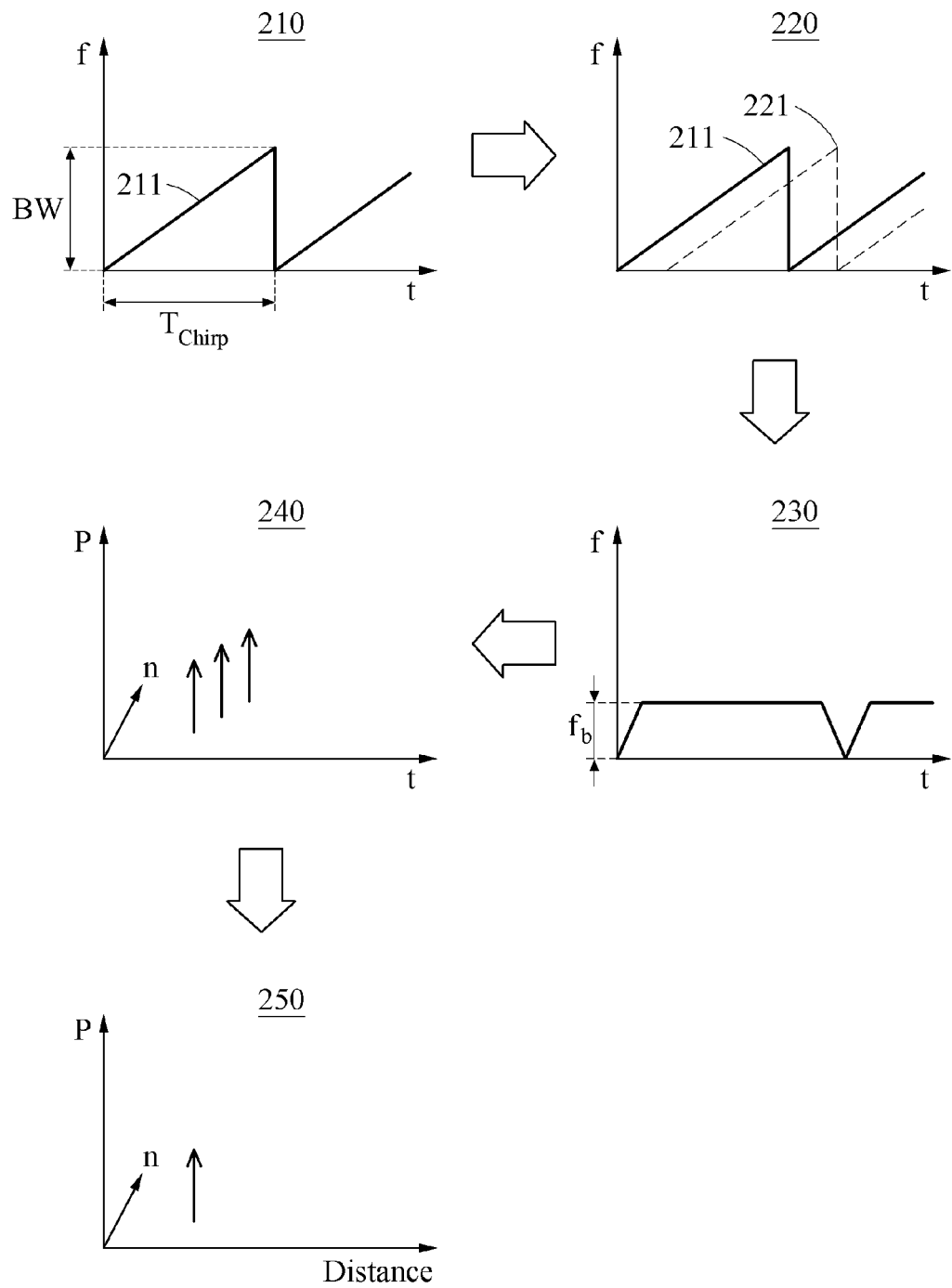
FIG. 2 is a diagram illustrating an example of a method of detecting a distance to an object and a speed of the object using a frequency modulated continuous wave (FMCW) signal.

FIG. 2 is a diagram illustrating an example of a method of detecting a distance to an object and a speed of the object using an FMCW signal.

Referring to FIG. 2, in operation 210, a transmitted signal 211, which is an FMCW signal, is propagated into the vicinity of a vehicle through a radar of the vehicle. The transmitted signal 211 may be a chirp signal, which is a signal with a linearly modulated frequency. A duration of a single chirp signal is indicated herein as $T_{chirp}$. The transmitted signal 211 may include identical chirp signals.

In operation 220, a reflected signal 221, which is a signal reflected by an object, is received through the radar. In an example, the reflected signal 221 is substantially the same as the transmitted signal 211, but is delayed by a time corresponding to a distance between the radar and the object. However, an amplitude of the reflected signal 221 may be less than an amplitude of the transmitted signal 211 due to a path loss.

In operation 230, a beat signal with a baseband frequency is generated by downconverting the reflected signal 221 using the transmitted signal 211. A frequency height $f_b$ of the beat signal may be proportional to the distance between the radar and the object. The frequency height $f_b$ of the beat signal may be referred to as a beat frequency, and represented by Equation 1. In Equation 1 below, C denotes a speed of light, BW denotes a frequency band of the transmitted signal 211, and R denotes the distance between the radar and the object. For example, in a case in which a frequency of the transmitted signal 211 is 77 GHz to 81 GHz, a BW may be 4 GHz.

$$f_b = \frac{2 \cdot BW \cdot R}{C \cdot T_{Chirp}} \quad \text{[Equation 1]}$$

When the beat signal is generated, the beat frequency $f_b$ may be determined and the distance R between the radar and the object may be calculated.

When the object or the radar moves, a relative speed of the object may be calculated using a Doppler frequency of the reflected signal 221. The Doppler frequency may be relatively lower than a center frequency of the reflected signal 221. Thus, the Doppler frequency may not be directly measured, but indirectly measured by measuring a phase change based on a change in Doppler frequency using a plurality of received chirp signals. A relationship between the relative speed of the object and the Doppler frequency may be represented by Equation 2. In Equation 2 below, v denotes the relative speed of the object, λ denotes a wavelength of the transmitted signal 211, and θ denotes an incidence angle of the reflected signal 221.

$$f_d = \frac{v}{\lambda} \cdot \cos\theta \quad \text{[Equation 2]}$$

In operation 240, the beat frequency $f_b$ is calculated based on a position of a peak value generated when performing a fast Fourier transform (FFT) on a single beat signal during a period corresponding to a duration $T_{chirp}$ of a chirp signal.

In operation 250, the distance to the object and the speed of the object are calculated through a two-dimensional (2D) FFT. Herein, a Doppler frequency of a beat signal may be measured simultaneously with a beat frequency by setting beat signals to a same time offset and detecting a maximum peak value through a 2D FFT. A beat signal may have a power component having a relatively high value at a position on a distance axis and a Doppler axis respectively corresponding to the distance to the object and the relative speed of the object. By detecting a component having power greater than or equal to a threshold value among sets of distance-Doppler data obtained by performing a 2D FFT on a plurality of beat signals, the distance to the object and the speed of the object may be calculated.

For example, when one antenna receives the reflected signal 221, the distance between the radar and the object and the speed of the object may be measured, although a direction of the object may not be measured. In this example, to measure the direction of the object, at least two antennas may be needed. The direction of the object may be determined based on a phase difference between reflected signals received by the antennas at a same time. Hereinafter, a method of determining a direction of an object will be described in detail with reference to FIGS. 3 through 14.

Figure 3:
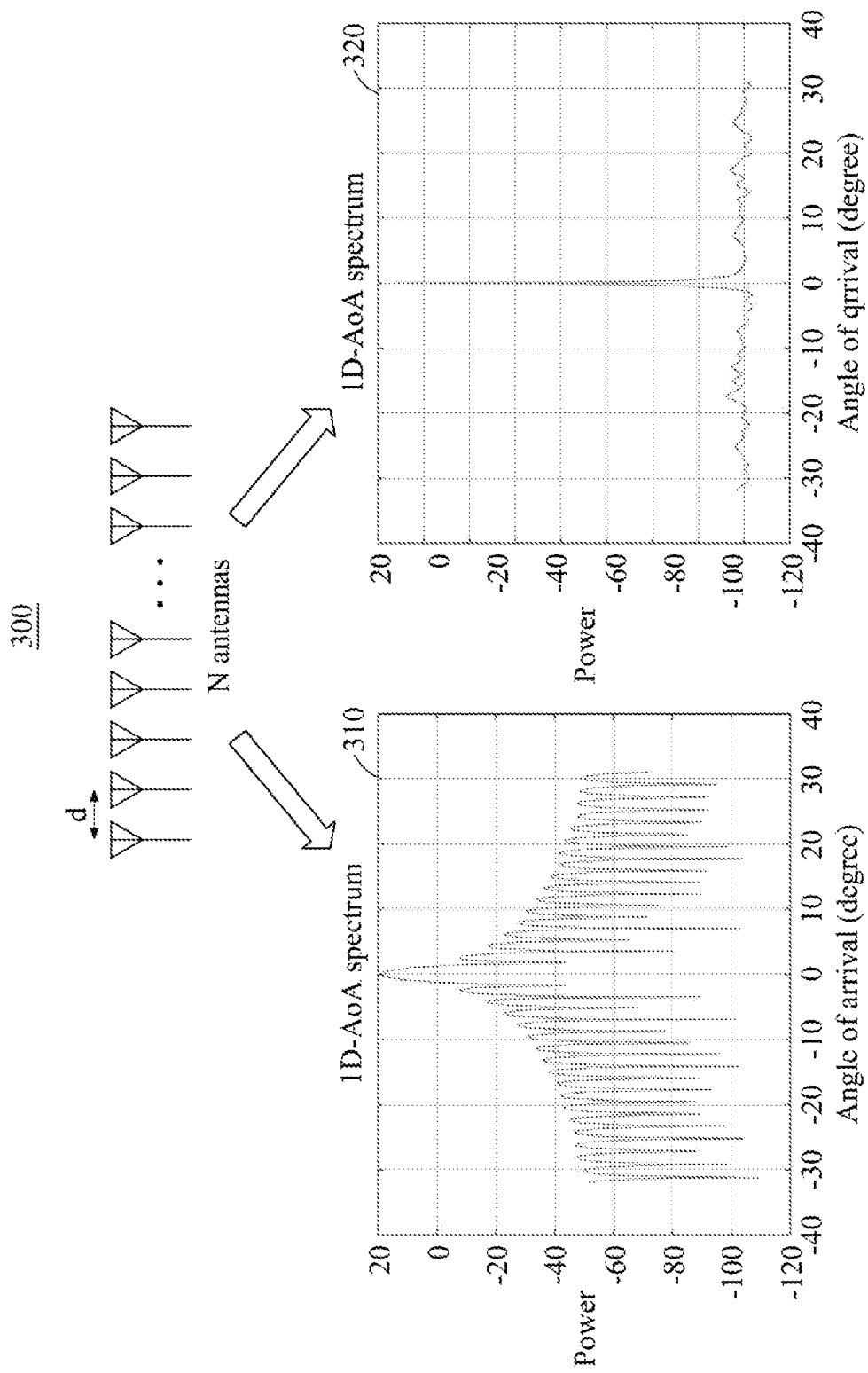
FIGS. 3 through 5 are diagrams illustrating examples of beam patterns generated through beamforming when an object is positioned in front of an antenna.
Figure 4:
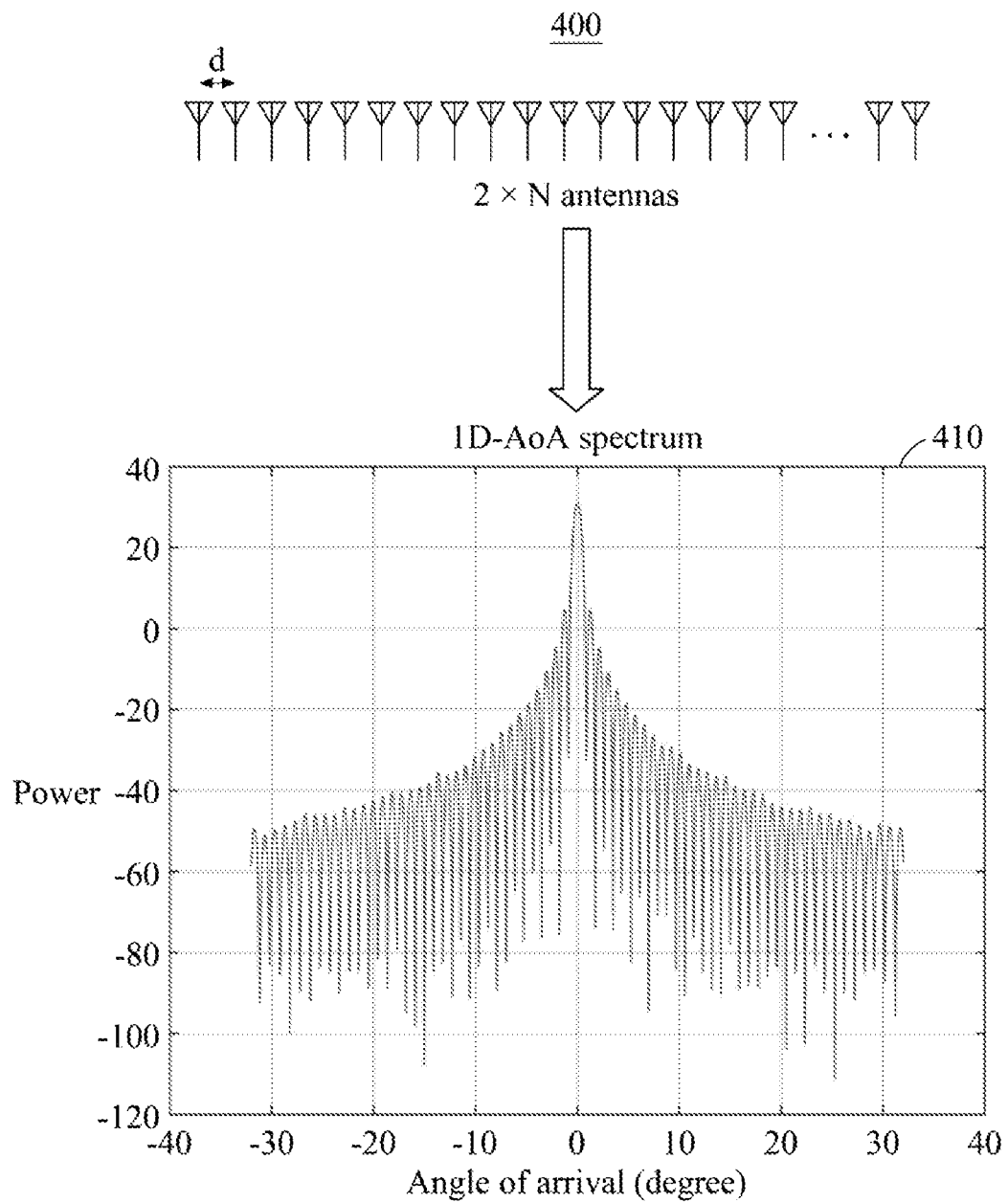
Figure 5:
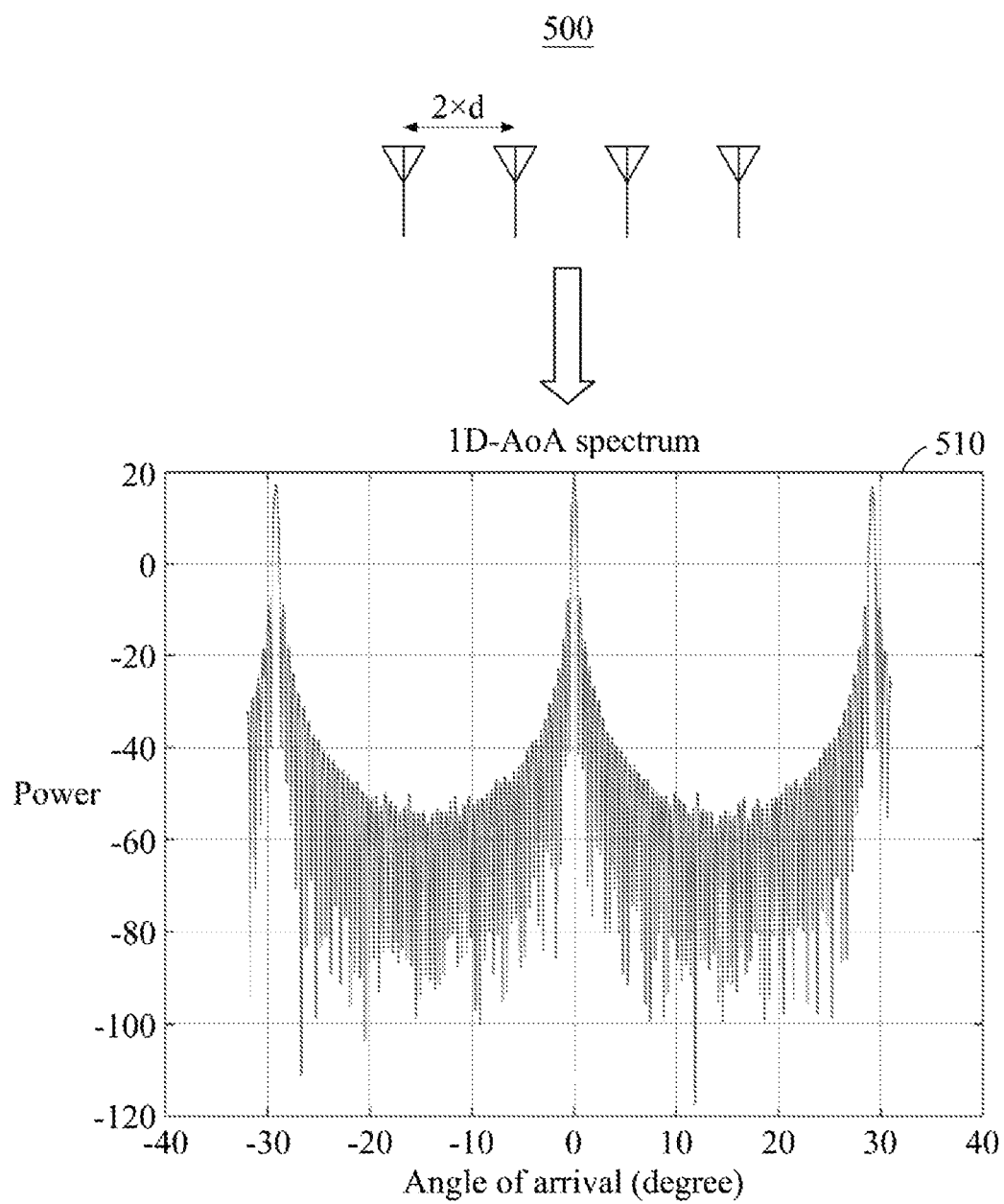

FIGS. 3 through 5 are diagrams illustrating examples of beam patterns generated through beamforming when an object is positioned in front of an antenna.

Example measurement results illustrated in FIGS. 3 through 5 may be obtained when all antennas of a radar are directed in a same direction and an object is positioned in front of the radar.

Beamforming refers to an operation of scanning a field of view (FoV) of a radar by adjusting antenna coefficients of the radar. An antenna coefficient refers to a coefficient that, when a reflected signal is received from a certain direction, maximizes a sum of power values measured by antennas of the radar. For example, an antenna coefficient associated with a direction may be a coefficient to modulate phases of reflected signals received at a same time to be identical.

Referring to FIG. 3, a first antenna array 300 includes N antennas, for example, 64 antennas, that are separate from each other by a distance d. In an example, the distance d is λ/2, in which λ may be a wavelength of a transmitted signal. The first antenna array 300 may be used to perform beamforming. The beamforming may be performed using, for example, digital beamforming (DBF) or a multiple signal classification (MUSIC) algorithm. The DBF may be relatively low in resolution of direction measurement compared to the MUSIC algorithm, although it may be relatively low in calculation complexity. The MUSIC algorithm may be relatively high in resolution of direction measurement although it may be relatively high in calculation complexity compared to the DBF.

As a result of the beamforming, a beam pattern may be obtained. As illustrated in FIG. 3, a beam pattern 310 is a result of the beamforming performed using the DBF, and a beam pattern 320 is a result of the beamforming performed using the MUSIC algorithm. In the example, the object is positioned in front of the radar, and thus a greatest power value may be at 0 degrees (°) based on the beam patterns 310 and 320. In this example, a beam width of the beam pattern 320 obtained through the MUSIC algorithm is narrower than that of the beam pattern 310 obtained through the DBF, and thus the radar may more readily distinguish different objects positioned closely to each other when using the MUSIC algorithm. That is, using the MUSIC algorithm may improve resolution of object detection.

Referring to FIG. 4, a second antenna array 400 includes 2×N antennas, for example, 128 antennas, that are separate from each other by a distance d. A beam pattern 410 obtained through beamforming performed using the second antenna array 400 may have a relatively higher resolution compared to the beam pattern 310 illustrated in FIG. 3. As the number of antennas of a radar increases, resolution of object direction measurement may also increase. However, when the number of the antennas increases, an amount of calculation or computation to be processed may increase and costs for a process and a memory for calculation in terms of hardware may thus increase.

Referring to FIG. 5, a third antenna array 500 includes N antennas that are separate from each other by a distance $2 \times \lambda/2$. A beam pattern 510 obtained through beamforming performed using the third antenna array 500 may have a relatively higher resolution compared to the beam pattern 310 illustrated in FIG. 3. However, when the distance is greater than the distance $2 \times \lambda/2$, an FoV may be reduced because a grating lobe occurs. An FoV obtained using the first antenna array 300 may be approximately −30° to +30°, whereas an FoV obtained using the third antenna array 500 may be approximately −15° to +15°.

Thus, when the number of antennas increases, a direction of an object may be more accurately calculated. However, an amount of calculation may also increase and a speed of detecting the direction may thus decrease. Thus, there is a desire for a method of increasing both the accuracy in detecting the direction and the speed of detecting the direction.

A method of detecting a direction of an object will be described in detail with reference to FIGS. 6 through 14.

Figure 6:
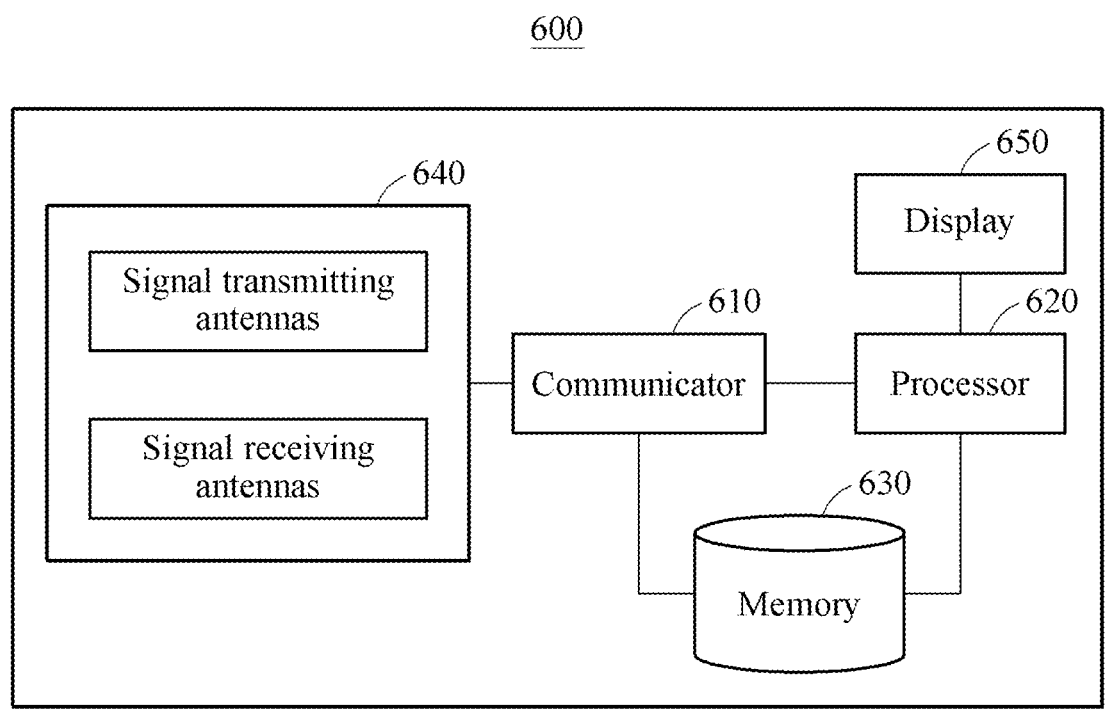
FIG. 6 is a diagram illustrating an example of an apparatus for determining a direction of an object.

FIG. 6 is a diagram illustrating an example of an apparatus for determining a direction of an object. The apparatus for determining a direction of an object will be hereinafter simply referred to as an object direction determining apparatus.

Referring to FIG. 6, an object direction determining apparatus 600 includes a communicator 610, a processor 620, a memory 630, a radar 640, and a display 650. The object direction determining apparatus 600 may be included in a vehicle. For example, the object direction determining apparatus 600 may incorporated in an electronic control unit (ECU) or a vehicle control unit (VCU) of the vehicle.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

In an example, the object direction determining apparatus 600 may be incorporated in an external device that is connected to an ECU or the VCU of the vehicle. The external device described herein refers to any devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, or other consumer electronics/information technology (CE/IT) device. However, the external device is not limited to the examples described in the forgoing. In an example, the object direction determining apparatus 600 is applicable to a robot requiring a positioning operation.

The embodiments may also be used to interpret the visual information in a device including an intelligent system such as a head-up display (HUD) installed for driving assistance in a vehicle or a fully autonomous driving system to assist safe and comfortable driving.

The communicator 610 may be connected to the processor 620, the memory 630, and the radar 640 to transmit and/or receive data. The communicator 610 may be connected to an external device to transmit and/or receive data.

In an example, the communicator 610 is embodied by a circuitry in the object direction determining apparatus 600. For example, the communicator 610 may include an internal bus and an external bus. For another example, the communicator 610 may be an element connecting the object direction determining apparatus 600 and an external device. The communicator 610 may be an interface. In this example, the communicator 610 may receive data from the external device, and transmit the received data to the processor 620 and the memory 630.

The processor 620 may process data received by the communicator 610 and data stored in the memory 630. Herein, a term "processor" may be a data processing device that is embodied by hardware having a circuit of a physical structure to perform desired operations. For example, the desired operations may include a code or instructions included in a program. The data processing device embodied by hardware may include, for example, a microprocessor, a central processing unit (CPU), a processor core, a multicore processor, a multiprocessor, an application-specific integrated circuit (ASIC), and a field-programmable gate array (FPGA). Further details regarding the processor 620 is provided below.

The processor 620 may execute a computer-readable code, for example, software, stored in the memory 630, and instructions induced by the processor 620.

The memory 630 may store data received by the communicator 610 and data processed by the processor 620. For example, the memory 630 may store a program. The program to be stored may be a set of syntaxes that is coded to determine a direction of an object and is implementable by the processor 620.

The memory 630 may include at least one volatile memory, nonvolatile memory, random access memory (RAM), flash memory, hard disk drive, and optical disc drive. Further details regarding the memory 630 is provided below.

The memory 630 may store a set of commands, for example, software, to operate the object direction determining apparatus 600. The set of commands used to operate the object direction determining apparatus 600 may be executed by the processor 620.

In an example, the display 650 is a physical structure that includes one or more hardware components that provide the ability to render a user interface and/or receive user input. In an example, the display 650 can be embedded in the object direction determining apparatus 600. In an example, the display 650 is an external peripheral device that may be attached to and detached from the object direction determining apparatus 600. The display 650 may be a single-screen or a multi-screen display. In an example, the processor 620 projects the object and the object's direction to a wind shield glass or a separate screen of the vehicle using a head-up display (HUD) 620. However, the displaying of the object in the image is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the object direction determining apparatus 600 may be used without departing from the spirit and scope of the illustrative examples described.

In an example, the radar 640 includes a plurality of antennas. For example, the antennas may transmit and receive a signal. For another example, the radar 640 may include an antenna to transmit a signal, and an antenna to receive a signal.

The communicator 610, the processor 620, the memory 630, and the radar 640 will be described in greater detail with reference to FIGS. 7 through 14.

Figure 7:
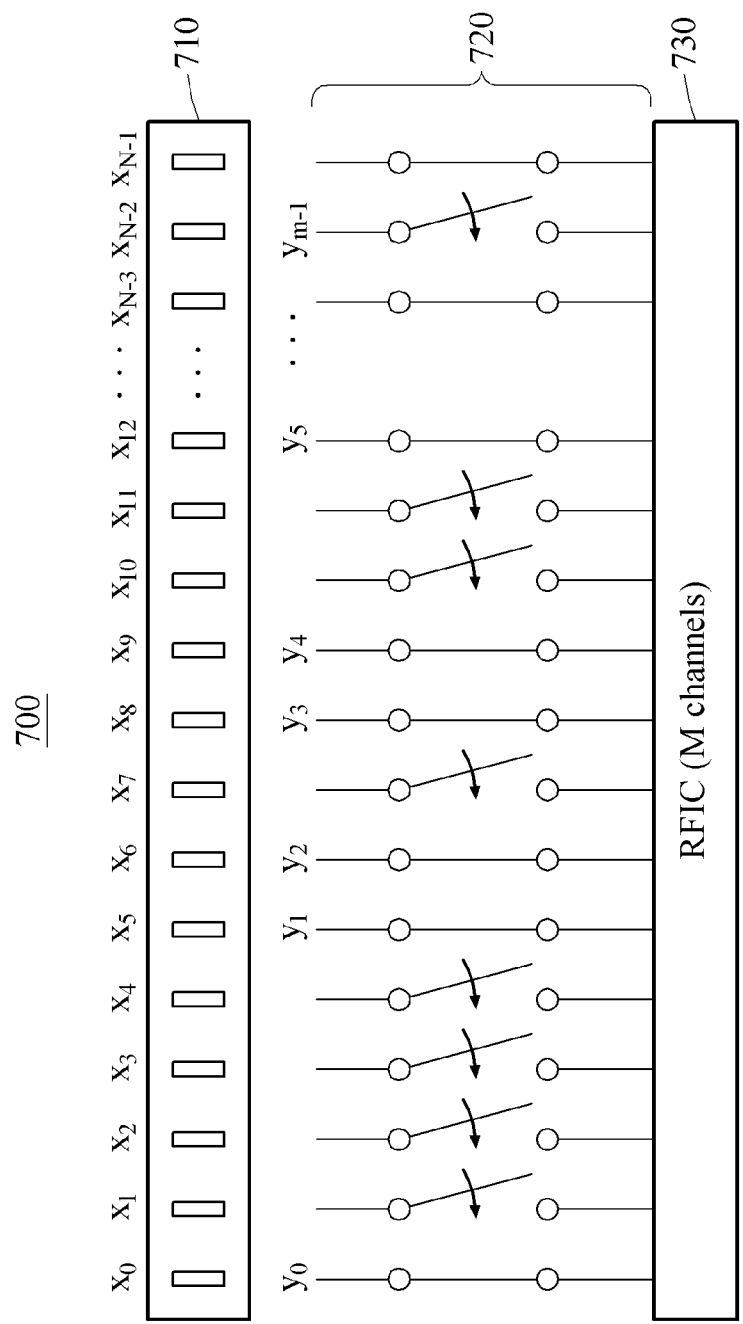
FIG. 7 is a diagram illustrating an example of an array of signal receiving antennas.

FIG. 7 is a diagram illustrating an example of an array of signal receiving antennas.

When N physical signal receiving antennas are included in the radar 640, M antenna signals may be selected from among N antenna signals or channels and the selected M antenna signals may be used to determine a direction of an object. In such a case, a compressed sensing algorithm may be used to reconstruct antenna signals, and such a reconstruction may reduce direction measurement resolution that may be caused by a reduction in the number of channels. Despite an amount of calculation increased by calculation performed to reconstruct a signal, reducing the number of channels that are primarily processed may reduce an overall amount of calculation.

The M antenna signals among the N antenna signals received by the N antennas may be determined by an antenna pattern. The object direction determining apparatus 600 may use the antenna pattern to receive signals through the M antenna channels among the N antenna channels.

Referring to FIG. 7, the radar 640 includes an array 700 of signal receiving antennas. The array 700 includes N physical antennas 710, a connector 720, and a radio frequency integrated circuit (RFIC) 730. The connector 720 may connect M antennas among the N antennas 710 to the RFIC 730 based on a set antenna pattern. The M antennas, for example, $x_0$, $x_5$, $x_6$, $x_8$, $x_9$, $x_{12}$, $x_{N-3}$, and $x_{N-1}$, may be connected to the RFIC 730.

The antenna pattern that is set to determine a direction of an object may be determined to obtain an optimal performance. The object direction determining apparatus 600 may determine the antenna pattern to obtain the optimal performance, and determine the direction of the object using the determined antenna pattern.

Figure 8:
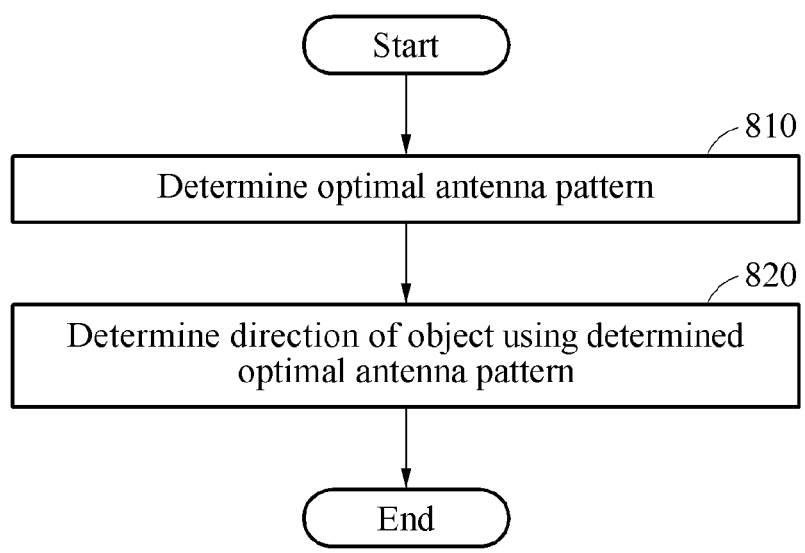
FIG. 8 is a diagram illustrating an example of a method of determining a direction of an object.

FIG. 8 is a diagram illustrating an example of a method of determining a direction of an object. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, the object direction determining apparatus 600 determines an optimal antenna pattern. For example, the object direction determining apparatus 600 may determine an antenna pattern from which an optimal performance may be obtained from among a plurality of candidate antenna patterns. For example, such a performance of a candidate antenna pattern may be evaluated based on a metric value indicating a value of power for a target direction relative to noise power. The target direction may be a direction of a detected object. A method of determining the optimal antenna pattern will be described in greater detail with reference to FIGS. 9 and 10.

In operation 820, the object direction determining apparatus 600 determines a direction of an object using the determined antenna pattern. For example, first scanning may be performed to determine an object detection region based on reduced antenna signals, and second scanning may be performed on the object detection region to determine a more accurate direction of the object. A method of determining a direction of an object using the determined antenna pattern will be described in greater detail with reference to FIGS. 11 and 12.

Figure 9:
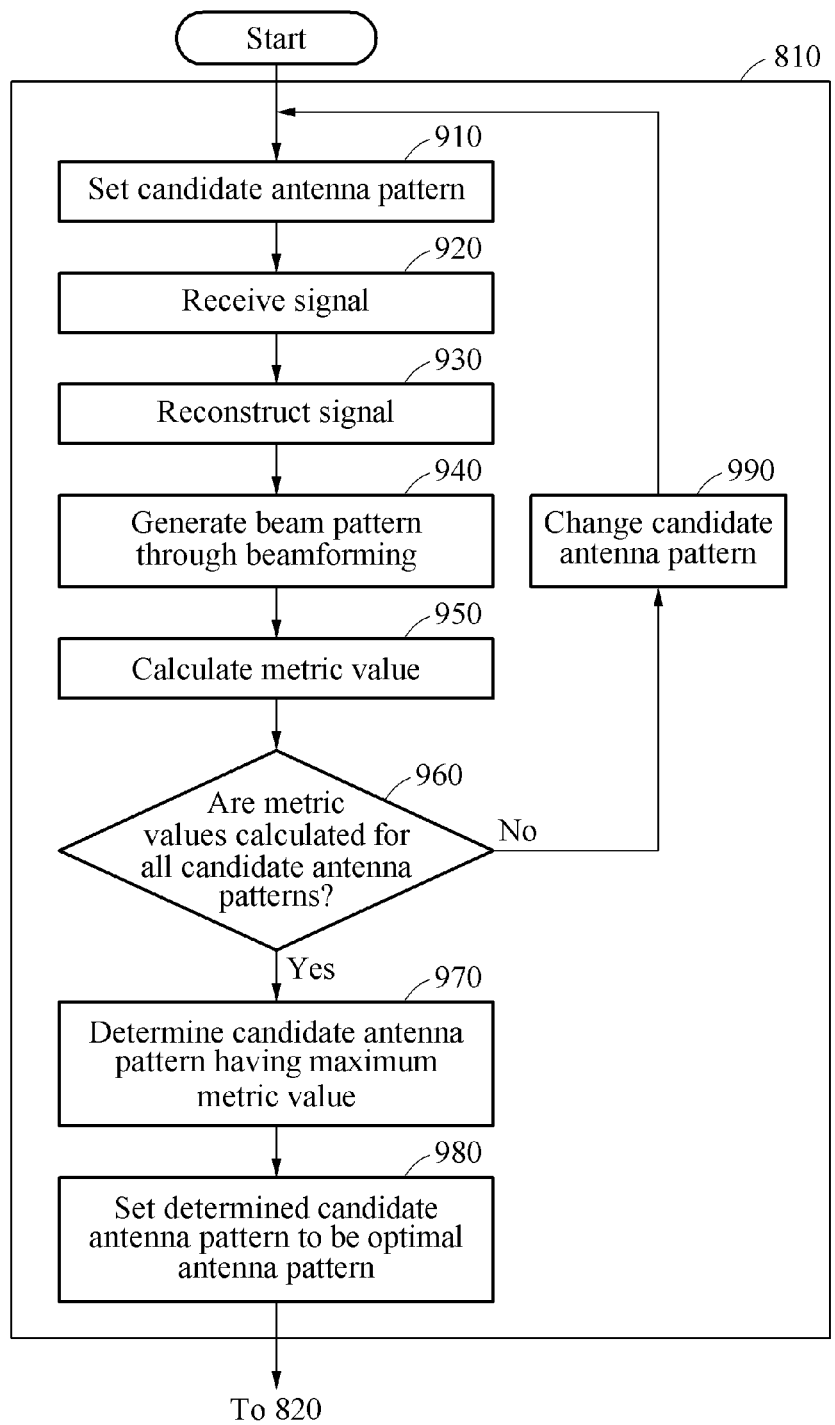
FIG. 9 is a diagram illustrating an example of a method of determining an optimal antenna pattern.

FIG. 9 is a diagram illustrating an example of a method of determining an optimal antenna pattern. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Operation 810 described above with reference to FIG. 8 may include operations 910 through 990 to be described hereinafter with reference to FIG. 9.

Referring to FIG. 9, in operation 910, the object direction determining apparatus 600 sets one of candidate antenna patterns, for example, a first candidate antenna pattern, to be an antenna pattern to receive a signal. For example, the first candidate antenna pattern may be a first pattern including M antennas selected from an array of N antennas.

In operation 920, the object direction determining apparatus 600 receives the signal using the set first candidate antenna pattern. For example, using the first candidate antenna pattern, M signals may be received.

In operation 930, the object direction determining apparatus 600 reconstructs signals through compressed sensing. For example, N signals may be generated by reconstructing the M signals.

In operation 940, the object direction determining apparatus 600 generates a beam pattern for the reconstructed signals through beamforming. For example, the object direction determining apparatus 600 may generate the beam pattern using a DBF or a MUSIC algorithm.

In operation 950, the object direction determining apparatus 600 calculates a first metric value of the first candidate antenna pattern based on the beam pattern. A metric value will be described in greater detail with reference to FIG. 10.

In operation 960, the object direction determining apparatus 600 determines whether a metric value of each of all the candidate antenna patterns is calculated. When a metric value is calculated for each of all the candidate antenna patterns, operation 970 is performed. When a metric value is not calculated for each of all the candidate antenna pattern, operation 990 is performed.

In operation 990, the object direction determining apparatus 600 changes the set antenna pattern to a candidate antenna pattern of which a metric value is not calculated among the candidate antenna patterns. Using the changed candidate antenna pattern, operations 910 through 960 may be re-performed.

In operation 970, the object direction determining apparatus 600 determines a candidate antenna pattern having a maximum metric value among calculated metric values.

In operation 980, the object direction determining apparatus 600 sets the determined candidate antenna pattern to be an optimal antenna pattern.

Figure 10:
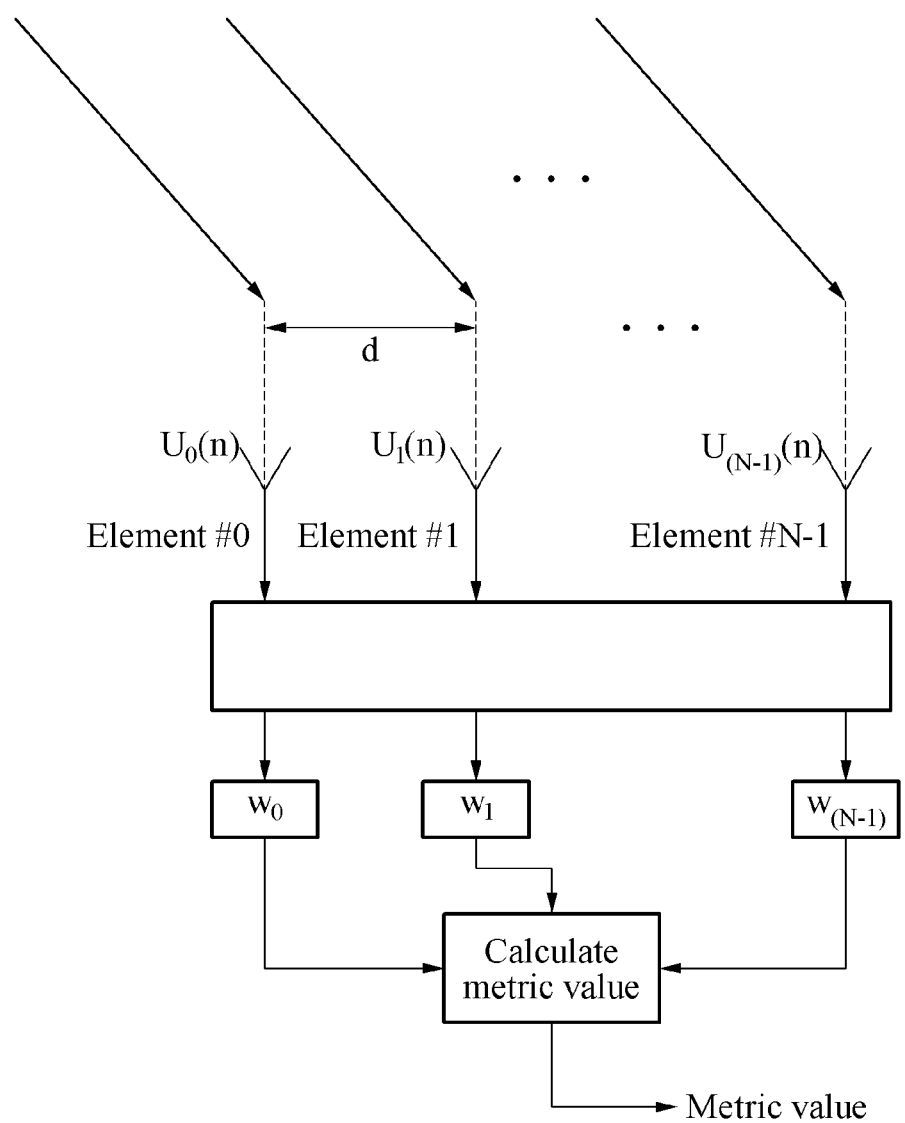
FIG. 10 is a diagram illustrating an example of a method of calculating a metric value.

FIG. 10 is a diagram illustrating an example of a method of calculating a metric value.

Referring to FIG. 10, the object direction determining apparatus 600 may receive M antenna signals among N antenna signals using a first candidate antenna pattern. The object direction determining apparatus 600 may generate N signals based on the received M antenna signals through compressed sensing.

The object direction determining apparatus 600 may calculate a first metric value of the first candidate antenna pattern using an antenna coefficient for each of the N signals. The first metric value may be a value of power for a target direction relative to noise power. The target direction may be a direction with a greatest value of power measured from a beam pattern. That is, the first metric value may be a ratio between maximum power and minimum power.

Figure 11:
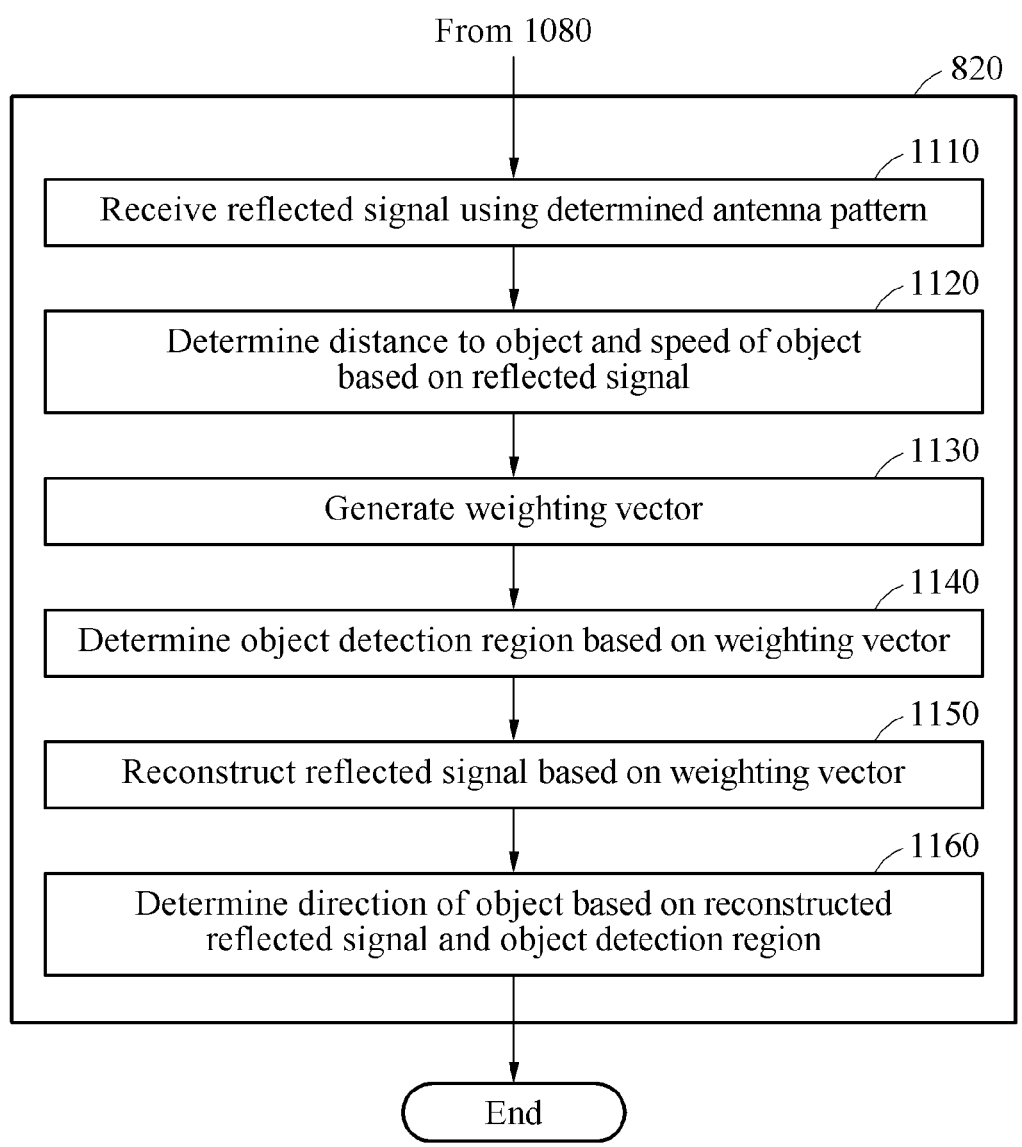
FIG. 11 is a diagram illustrating an example of a method of determining a direction of an object using a determined optimal antenna pattern.

FIG. 11 is a diagram illustrating an example of a method of determining a direction of an object using a determined optimal antenna pattern. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Operation 820 described above with reference to FIG. 8 may include operations 1110 through 1160 to be described hereinafter with reference to FIG. 11.

Referring to FIG. 11, the object direction determining apparatus 600 transmits a signal before performing operation 1110, and the transmitted signal may be reflected by an object.

In operation 1110, the object direction determining apparatus 600 receives the reflected signal, or a compressed signal, using a determined antenna pattern.

In operation 1120, the object direction determining apparatus 600 determines a distance to the object and a speed of the object. The compressed signal may also be used to determine the distance to the object and the speed of the object. For example, the distance to the object and the speed of the object may be determined by performing operations 230 through 250 described above with reference to FIG. 2.

In operation 1130, the object direction determining apparatus 600 generates a weighting vector based on the reflected signal.

In a case in which a set of received reflected signals is defined as $y=\{y_1, y_2, \ldots, y_{M-1}\}$ and a set of signals to be generated through reconstruction is defined as $x=\{x_1, x_2, \ldots, x_{N-1}\}$, a relationship between y and x may be represented by Equation 3.

$$y = \Phi \cdot x \quad \text{[Equation 3]}$$

In Equation 3, $\Phi$ denotes an N×M matrix, which is represented by Equation 4.

$$\Phi = \begin{bmatrix} 1, 0, 0, 0, 0, 0, 0, \ldots, 0 \\ 0, 0, 0, 1, 0, 0, 0, \ldots, 0 \\ 0, 0, 0, 0, 1, 0, 0, \ldots, 0 \\ \ldots \\ 0, 0, 0, 0, 0, 0, 0, \ldots, 1 \end{bmatrix} \quad \text{[Equation 4]}$$

In the N×M matrix $\Phi$ as represented by Equation 4 above, 1 and 0 indicate a relationship between N antennas and M antennas for receiving reflected signals among the N antennas. For example, when an element of a first column of a first row is 1, it may indicate that a reflected signal received by a first antenna among the N antennas is selected. Similarly, when an element of a fourth column of a second row is 1, it may indicate that a reflected signal received by a fourth antenna among the N antennas is selected.

To obtain x using Equation 3, an inverse matrix of the matrix $\Phi$ may need to be present. However, the matrix $\Phi$ is a rectangular matrix with an N×M dimension. Thus, the following equation may be performed to obtain x using Equation 3.

Using an N×M basis matrix $\Psi$, x may be represented by Equation 5.

$$x=\sum_{i=1}^{N}s_i\cdot\Psi_i \text{ or } x=\Psi\cdot s_x \quad \text{[Equation 5]}$$

In Equation 5, $\Psi_i$ denotes an i-th basis vector of $\Psi$. Thus, $\Psi$ may be represented by Equation 6.

$$\Psi=[\Psi_1|\Psi_2|,\ldots|\Psi_N] \quad \text{[Equation 6]}$$

S denotes a weighting vector with an N×1 dimension, and may be represented by Equation 7.

$$s=\{s_0,s_1,\ldots,s_i,\ldots,s_{N-1}\} \quad \text{[Equation 7]}$$

$\Psi_i$ may be represented as an FFT vector as represented by Equation 8.

$$\Psi_i^T=\{1,e^{-j\cdot 2\pi i\cdot 1/N},e^{-j\cdot 2\pi i\cdot 2/N},\ldots,e^{-j\cdot 2\pi i\cdot (N-1)/N}\}, 0\leq i\leq N \quad \text{[Equation 8]}$$

In a case of a sparse vector of which most components of S have a value close to 0 and a certain component has a value not being 0, x may be obtained from y. Using $\Psi$, Equation 3 may be transformed into Equation 9.

$$y=\Phi\cdot x=\Phi\cdot\Psi\cdot s=\Theta\cdot s \quad \text{[Equation 9]}$$

In Equation 9, $\Theta=\Phi\cdot\Psi$ may be an M×N matrix. S may be calculated using Equation 9. S may be a vector having a maximum value at a certain position and a value close to 0 at a remaining other position. Herein, the certain position at which S has the maximum value may be nonlinearly proportional to a direction of an object.

Figure 12:
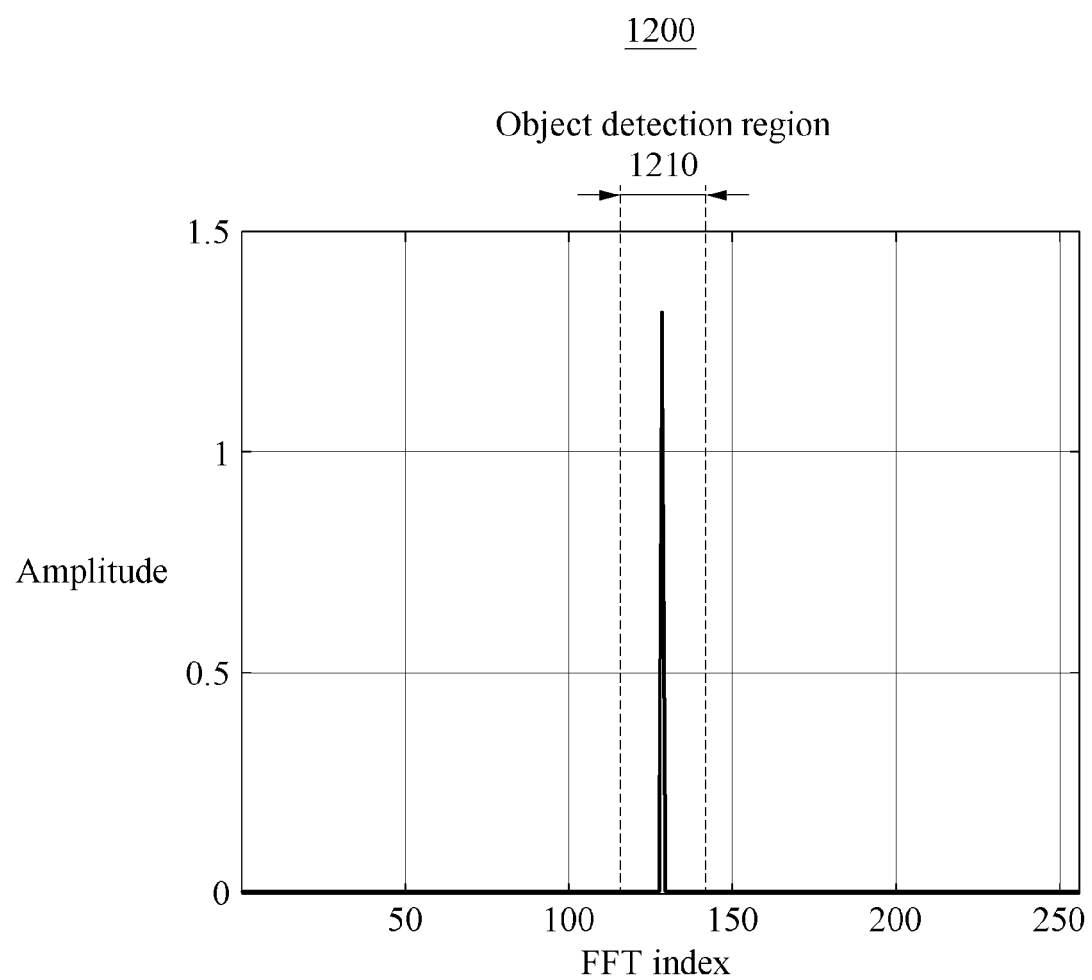
FIG. 12 is a diagram illustrating an example of an object detection region.

For example, the certain position may be indicated as an FFT index which is approximately 127 as illustrated in FIG. 12. In the example illustrated in FIG. 12, an object is present in front, for example, 0°, and it is verified that a position, for example, the index 127, of a component having a great value not being 0 among components of S may be related to a direction of the object, for example, 0°.

Thus, an approximate direction of the object may be determined using S, although x is not obtained.

In operation 1140, the object direction determining apparatus 600 determines an object detection region based on the weighting vector. For example, the object direction determining apparatus 600 may generate a beam pattern based on the weighting vector, and determine the object detection region based on the beam pattern.

In an example, the object direction determining apparatus 600 determine a direction corresponding to a position of a component having a non-zero large value among the components of S using the equation 10 below.

$$\text{Object direction} = \sin^{-1}\left(\frac{i_{max}\times\lambda}{d\times N}\right)\left(\frac{180°}{\pi}\right) \quad \text{[Equation 10]}$$

$$\text{where, } i_{max} = \begin{cases} \text{argmax}(s_i), i=0,1,\ldots,\frac{N}{2}-1 \\ \text{argmax}(s_i), N, i, =\frac{N}{2},\ldots,N-1 \end{cases}$$

For example, in a case in which S has a total of 256 components and an FoV is −15° to +15°, and a position of a component having a large value among the components of S is a middle position, for example, a 128-th position, an approximate direction of the object may be determined to be 0° which is between −15° and +15°.

Based on the approximate direction of the object, the object detection region may be determined to be a range from −a° to +a°, in which a may be a preset value. For example, in a case in which the approximate direction of the object is at 0° and a is 2, a range from −2° to +2° may be determined to be the object detection region.

In operation 1150, the object direction determining apparatus 600 reconstructs the reflected signal based on the weighting vector. For example, the object direction determining apparatus 600 may reconstruct the reflected signal based on the weighting vector through compressed sensing.

As represented by Equation 9 above, when the weighting vector S is a sparse vector, x, or the reconstructed reflected signal, may be obtained through a 'minimum L1 norm reconstruction' optimization method.

In operation 1160, the object direction determining apparatus 600 determines a direction of the object based on the reconstructed reflected signal and the object detection region. In an example, the object direction determining apparatus 600 may perform beamforming only on the object detection region to generate the beam pattern. Thus, the beamforming may be performed only on a relatively narrow region compared to an FoV, and a required amount of calculation is reduced. In addition, the beamforming may be performed only on such a narrow region, and thus an amount of calculation may not increase greatly although a scan interval of the beamforming is adjusted to be narrow. The interval of the beamforming may be adjusted to be narrower, and thus accuracy in determining the direction of the object may increase.

FIG. 12 is a diagram illustrating an example of an object detection region.

Referring to FIG. 12, a beam pattern 1200 may be generated using a weighting vector. The weighting vector may be 256×1, and a component of the weighting vector after performing an FFT on obtained data may correspond to an FFT index. For example, the FFT index may be 0 to 255. In the beam pattern 1200, a maximum amplitude may be generated at an index 127 or 128. A direction of an object corresponding to the index 127 or 128 may be determined, and directions around the determined direction may be determined to be an object detection region 1210. For example, in a case of an FoV being −30° to +30°, the index 127 or 128 may correspond to 0° or thereabout. The object detection region 1210 may be determined to include 0°.

Figure 13:
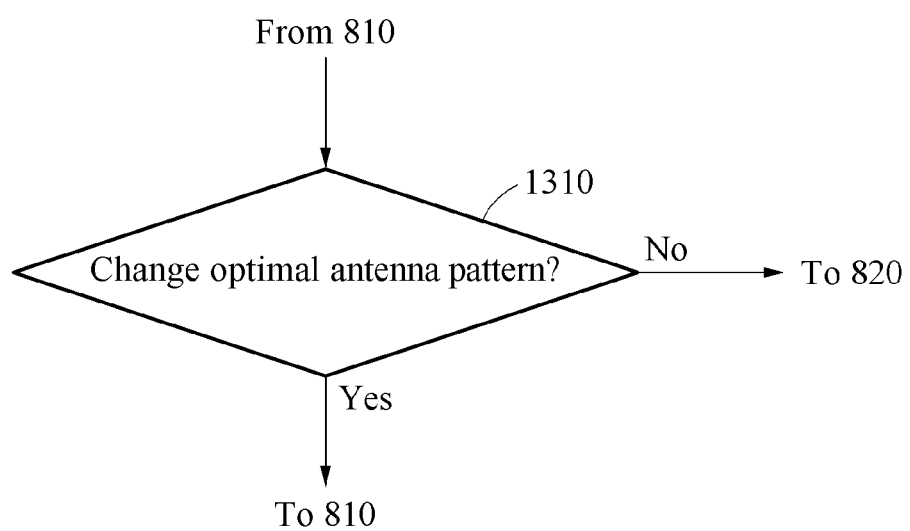
FIG. 13 is a diagram illustrating an example of a method of changing an optimal antenna pattern.

FIG. 13 is a diagram illustrating an example of a method of changing an optimal antenna pattern. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Operation 1310 to be described hereinafter with reference to FIG. 13 may be performed after operation 810 described above with reference to FIG. 8 is performed. Operation 1310 may be performed independently from and in parallel to operation 820 described above with reference to FIG. 8.

Referring to FIG. 13, in operation 1310, the object direction determining apparatus 600 determines whether to change an optimal antenna pattern. For example, operation 810 may be first performed at a point in time at which the object direction determining apparatus 600 starts performing operations, and re-performed when a preset condition is satisfied.

A method of determining whether to change an optimal antenna pattern will be described in greater detail with reference to FIG. 14.

Figure 14:
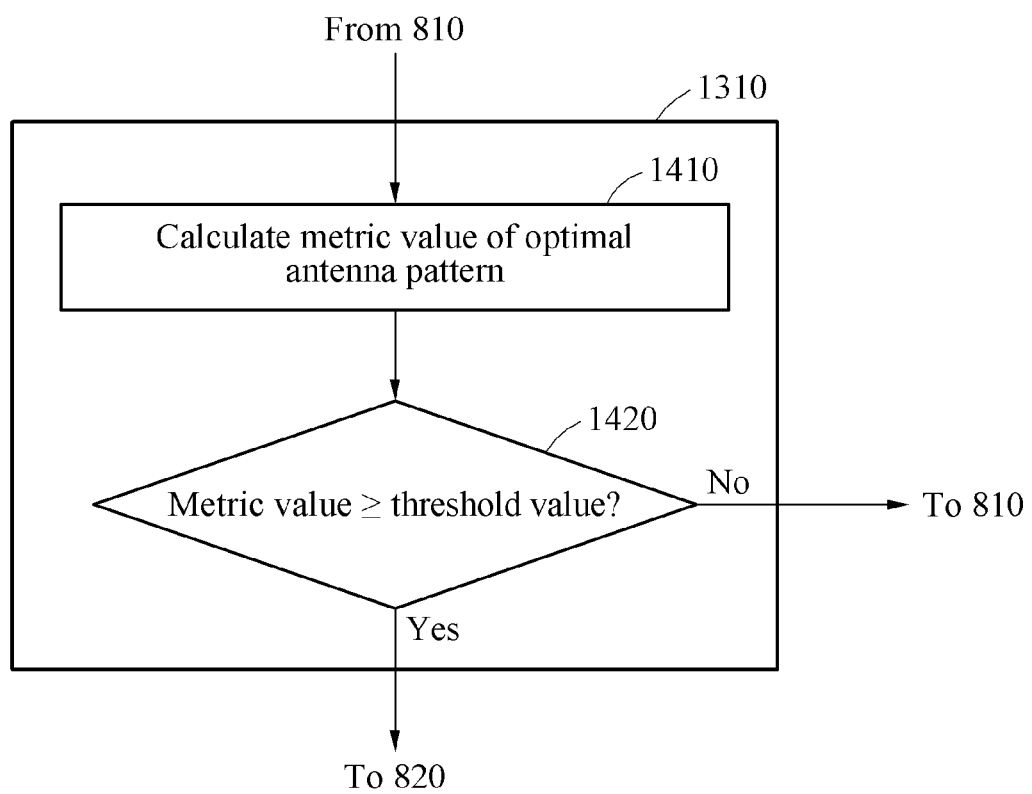
FIG. 14 is a diagram illustrating an example of a method of changing an optimal antenna pattern based on a metric value.

FIG. 14 is a diagram illustrating an example of a method of changing an optimal antenna pattern based on a metric value. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. One or more blocks of FIG. 14, and combinations of the blocks, can be implemented by special purpose hardware-based computer that perform the specified functions, or combinations of special purpose hardware and computer instructions. In addition to the description of FIG. 14 below, the descriptions of FIGS. 1-13 are also applicable to FIG. 14, and are incorporated herein by reference. Thus, the above description may not be repeated here.

Operation 1310 described above with reference to FIG. 13 may include operations 1410 and 1420 to be described hereinafter with reference to FIG. 14.

Referring to FIG. 14, in operation 1410, the object direction determining apparatus 600 calculates a metric value of an optimal antenna pattern. For example, the metric value of the optimal antenna pattern may be calculated on a periodic basis.

In operation 1420, the object direction determining apparatus 600 determines whether the calculated metric value is greater than or equal to a threshold value. In response to the metric value being less than the threshold value, the object direction determining apparatus 600 determines to change the optimal antenna pattern.

In an example, the object direction determining apparatus 600 may continuously compare, to the threshold value, a metric value that is calculated on a periodic basis. In this example, when the number of times that the metric value is less than the threshold value reaches a preset number of times, the object direction determining apparatus 600 may determine to change the optimal antenna pattern.

The object direction determining apparatus, object direction determining apparatus 600, communicator 610, and other apparatuses, units, modules, and components described herein with respect to FIGS. 1 and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, and 8-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of determining a direction of an object using a plurality of antennas, the method comprising:
   determining, by a processor using at least two or more antennas of the plurality of the antennas, an optimal antenna pattern to determine the direction of the object from among candidate antenna patterns; and
   determining, by the processor, the direction of the object based on the optimal antenna pattern,
   wherein the determining of the direction of the object comprises:
      receiving a reflected signal based on the optimal antenna pattern;
      generating a weighting vector based on the reflected signal;
      determining an object detection region based on the weighting vector;
      reconstructing the reflected signal through compressed sensing; and
      determining the direction of the object based on the reconstructed reflected signal and the object detection region.

2. The method of claim 1, wherein the determining of the optimal antenna pattern comprises:
   determining a candidate antenna pattern having a maximum metric value from among metric values calculated for each of the candidate antenna patterns; and
   setting the determined candidate antenna pattern to be the optimal antenna pattern,
   wherein a metric value comprises a value of power for a target direction relative to noise power.

3. The method of claim 2, wherein the determining of the optimal antenna pattern further comprises:
   setting a first candidate antenna pattern from among the candidate antenna patterns;
   receiving M signals based on the first candidate antenna pattern;
   generating N signals by reconstructing the M signals;
   generating a beam pattern for the N signals through beamforming;
   calculating a first metric value of the first candidate antenna pattern based on the beam pattern; and
   determining whether a metric value of each of the candidate antenna patterns is calculated.

4. The method of claim 3, wherein the first antenna pattern comprises M antennas selected from an array of N antennas.

5. The method of claim 3, wherein the generating of the N signals by reconstructing the M signals comprises:
   generating the N signals based on the M signals through compressed sensing.

6. The method of claim 1, wherein the determining of the direction of the object further comprises:
   transmitting a signal,
   wherein the reflected signal is a signal of the transmitted signal reflected by the object.

7. The method of claim 6, wherein the transmitted signal is a signal modulated based on a frequency modulated continuous wave (FMCW), a phase modulated continuous wave (PMCW), or a frequency-shift keying (FSK) scheme.

8. The method of claim 1, wherein the determining of the object detection region comprises:
generating a beam pattern based on the weighting vector; and
determining the object detection region based on the beam pattern.

9. The method of claim 1, wherein the determining of the direction of the object further comprises:
determining a distance to the object and a speed of the object based on the reflected signal.

10. The method of claim 9, wherein the determining of the object detection region based on the weighting vector comprises:
determining, to be the object detection region, a region corresponding to the determined distance and the determined speed.

11. The method of claim 1, further comprising:
determining whether to change the optimal antenna pattern.

12. The method of claim 11, wherein the determining of whether to change the optimal antenna pattern comprises:
calculating a metric value of the optimal antenna pattern; and
determining to change the optimal antenna pattern, in response to the metric value being less than a threshold value.

13. An apparatus for determining a direction of an object, comprising:
a processor configured to:
determine an optimal antenna pattern to determine the direction of the object from among candidate antenna patterns, using, by the processor, at least two or more antennas of plural antennas; and
determine the direction of the object using based on the optimal antenna pattern,
wherein, for the determining of the direction of the object, the processor is further configured to:
receive a reflected signal based on the optimal antenna pattern;
generate a weighting vector based on the reflected signal;
determine an object detection region based on the weighting vector;
reconstruct the reflected signal through compressed sensing; and
determine the direction of the object based on the reconstructed reflected signal and the object detection region.

14. The apparatus of claim 13, wherein the processor is further configured to:
determine a candidate antenna pattern having a maximum metric value from among metric values calculated for each of the candidate antenna patterns; and
set the determined candidate antenna pattern to be the optimal antenna pattern,
wherein a metric value comprises a value of power for a target direction relative to noise power.

15. The apparatus of claim 13, wherein the processor is further configured to determine the optimal antenna pattern at periodic intervals.

16. The apparatus of claim 13, further comprising a memory storing instructions that, when executed, configure the processor to determine the optimal antenna pattern, and to determine the direction of the object.

17. An apparatus for determining a direction of an object, comprising:
a radar comprising a plurality of antennas; and
a processor configured to:
determine a candidate antenna pattern having a maximum metric value from metric values calculated for respective candidate antenna patterns, the respective candidate antenna patterns comprising at least two or more antennas of the plurality of the antennas;
set the determined candidate antenna pattern to be the optimal antenna pattern;
determine the direction of the object based on the optimal antenna pattern; and
render the object and the direction of the object on a display,
wherein, for the determining of the direction of the object, the processor is further configured to:
receive a reflected signal based on the optimal antenna pattern;
generate a weighting vector based on the reflected signal;
determine an object detection region based on the weighting vector;
reconstruct the reflected signal through compressed sensing; and
determine the direction of the object based on the reconstructed reflected signal and the object detection region.

* * * * *